United States Patent
Ellenby et al.

(10) Patent No.: US 6,522,292 B1
(45) Date of Patent: Feb. 18, 2003

(54) INFORMATION SYSTEMS HAVING POSITION MEASURING CAPACITY

(75) Inventors: Thomas Ellenby, San Francisco, CA (US); Peter Ellenby, San Francisco, CA (US); Jeffrey Alan Jay, Petaluma, CA (US)

(73) Assignee: GeoVector Corp., San Francisco, CA (US)

( * ) Notice: Subject to any disclaimer, the term of this patent is extended or adjusted under 35 U.S.C. 154(b) by 0 days.

(21) Appl. No.: 09/510,889

(22) Filed: Feb. 23, 2000

(51) Int. Cl.[7] .......................... G06F 17/60; G01S 5/02; G06T 17/00; G09G 5/10; H04B 7/185

(52) U.S. Cl. .................. 342/357.07; 345/7; 345/435; 702/150; 702/153; 705/28; 707/1

(58) Field of Search ............................... 340/988–995; 342/357.06, 357.07, 357.11, 450, 451, 457; 455/456–7; 707/1; 702/150–154; 382/103, 154, 181, 276; 701/207–8, 213, 216; 705/28; 345/7, 435

(56) References Cited

U.S. PATENT DOCUMENTS

| | | |
|---|---|---|
| 2,994,971 A | 8/1961 | Meisenheimer et al. |
| 3,729,315 A | 4/1973 | Conklin et al. |
| 3,769,894 A | 11/1973 | Conklin |
| 3,923,370 A | 12/1975 | Mostrom |
| RE28,847 E | 6/1976 | Vizenor |
| 3,990,296 A | 11/1976 | Erikson |
| 4,322,726 A | 3/1982 | Collier et al. |
| 4,380,024 A | 4/1983 | Olofsson |
| 4,425,581 A | 1/1984 | Schweppe et al. |
| 4,439,755 A | 3/1984 | La Russa |
| 4,489,389 A | 12/1984 | Beckwith et al. |
| 4,572,203 A | 2/1986 | Feinstein |
| 4,600,200 A | 7/1986 | Oka et al. |
| 4,645,459 A | 2/1987 | Graf et al. |
| 4,662,635 A | 5/1987 | Enokian |
| 4,684,990 A | 8/1987 | Oxley |
| 4,736,306 A | 4/1988 | Christensen et al. |
| 4,805,121 A | 2/1989 | Scott et al. |
| 4,807,158 A | 2/1989 | Blanton et al. |
| 4,835,532 A | 5/1989 | Fant |
| 4,855,822 A | 8/1989 | Narenda et al. |
| 4,894,922 A | 1/1990 | Lovelock |
| 4,939,661 A | 7/1990 | Barker et al. |
| 4,940,972 A | 7/1990 | Mouchot et al. |
| 4,947,323 A | 8/1990 | Smith |
| 4,970,666 A | 11/1990 | Welsh et al. |
| 5,020,902 A | 6/1991 | Kits van Jevningen et al. |
| 5,034,812 A | 7/1991 | Rawlings |
| 5,072,218 A | 12/1991 | Spero et al. |
| 5,115,398 A | 5/1992 | DeJong |
| 5,124,915 A | 6/1992 | Krenzel |
| 5,182,641 A | 1/1993 | Diner et al. |
| 5,189,630 A | 2/1993 | Barstow et al. |
| 5,252,950 A | 10/1993 | Saunders et al. |
| 5,269,065 A | 12/1993 | Ida |
| 5,296,854 A | 3/1994 | Hamilton et al. |
| 5,311,203 A | 5/1994 | Norton |
| 5,320,351 A | 6/1994 | Suzuki |
| 5,322,441 A | 6/1994 | Lewis et al. |

(List continued on next page.)

Primary Examiner—Thomas H. Tarcza
Assistant Examiner—Fred H. Mull
(74) Attorney, Agent, or Firm—Page Lohr

(57) ABSTRACT

Systems are arranged to provide a user information which relates to objects of interest. A user may provide indication of a directional reference to a device. The device determines which objects are being addressed by searching a database containing preprogrammed information relating to objects. Information relating to objects being addressed can then be presented at a user interface. A device of the system may include a point reference, a position determining means, a input receiving means, a computer processor and database, and a user interface. Methods of the system includes the steps of indicating a direction, determining position, searching a database, and presenting information to a user.

4 Claims, 14 Drawing Sheets

U.S. PATENT DOCUMENTS

| | | |
|---|---|---|
| 5,333,874 A | 8/1994 | Arnold et al. |
| 5,342,051 A | 8/1994 | Rankin et al. |
| 5,353,134 A | 10/1994 | Michel et al. |
| 5,367,578 A | 11/1994 | Golem et al. |
| 5,394,517 A | 2/1995 | Kalawsky |
| 5,410,649 A | 4/1995 | Gove |
| 5,454,043 A | 9/1995 | Freeman |
| 5,457,447 A | 10/1995 | Ghaem et al. |
| 5,462,275 A | 10/1995 | Lowe et al. |
| 5,467,444 A | 11/1995 | Kawamura et al. |
| 5,479,597 A | 12/1995 | Fellous |
| 5,528,232 A | 6/1996 | Verma et al. |
| 5,682,332 A * | 10/1997 | Ellenby et al. ............. 702/150 |
| 5,696,837 A | 12/1997 | Green |
| 5,796,386 A | 8/1998 | Lipscomb et al. |
| 5,801,704 A | 9/1998 | Oohara et al. |
| 5,815,411 A * | 9/1998 | Ellenby et al. ............. 702/150 |
| 5,929,848 A | 7/1999 | Albukerk et al. |
| 5,960,413 A * | 9/1999 | Amon et al. ................... 705/28 |
| 5,961,571 A * | 10/1999 | Gorr et al. ................... 701/207 |
| 6,215,503 B1 * | 4/2001 | Snyder et al. ............. 345/433 |

\* cited by examiner

INFORMATION SYSTEMS HAVING POSITION MEASURING CAPACITY

BACKGROUND OF THE INVENTION

1. Field

The field of the inventions described herefollowing may best be characterized as information systems having position measuring capacity combined with attitude indication facility and more particularly by information systems which interact with a database of data elements having geometric descriptors associated therewith.

2. Prior Art

Applicants' copending U.S. patent applications having Ser. Nos. 09/110,572 and 09/163,746 each relate to information systems which interact with a database of data elements having geometric descriptors associated with the data elements, however, those systems each rely on the devices having a means of determining the pointing direction of a directional reference associated with the device.

While the systems and inventions of the art are designed to achieve particular goals and objectives, some of those being no less than remarkable, these inventions have limitations which prevent their use in new ways now possible. These inventions of the art are not used and cannot be used to realize the advantages and objectives of the present invention.

It should be understood that all of the herein referenced materials provide considerable definition of elements of the present invention. Therefore, those materials are incorporated herein by reference whereby the instant specification can rely upon them for enablement of the particular teachings of each.

SUMMARY OF THE INVENTION

Comes now, Tom Ellenby, Peter Ellenby, and Jeffrey Alan Jay with an invention of information systems having position measuring capacity including devices for and methods of presenting information to a user whereby the information presented relates to the position and directional references.

The present invention includes devices and methods for presenting information relating to objects having an association with a particular geometry and location. A device which determines its position and receives indication of a reference direction, responds by searching a database and determining which objects are being addressed; and further by presenting information which relates to addressed objects.

An address indicator defined by the measured position and indicated attitude is used to search a database. The database being comprised of data elements each having a 'geometric descriptor' or spatial definition may include data elements which have a geometric descriptor which forms an intersection with a particular address indicator. When an object's geometric descriptor forms an intersection with a system's address indicator, the object is said to be 'addressed' by the system. Database search results produces output including information relating to objects being addressed by a device. The information is presented to a user via a user interfaces which may include graphical user interfaces such as a video display device, among others.

OBJECTIVES OF THE INVENTION

It is a primary objective of the invention to provide systems for presenting information.

It is further an objective to provide systems for addressing an object and presenting information relating to the object.

It is further an objective to provide systems for addressing an object, identifying the object and presenting information relating to the object.

It is further an objective to provide systems for addressing an object, recalling information relating to the object by way of a spatial reference and presenting information relating to the object being addressed.

A better understanding can be had with reference to the detailed description of preferred embodiments and with reference to the appended drawings. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

Figure 1:
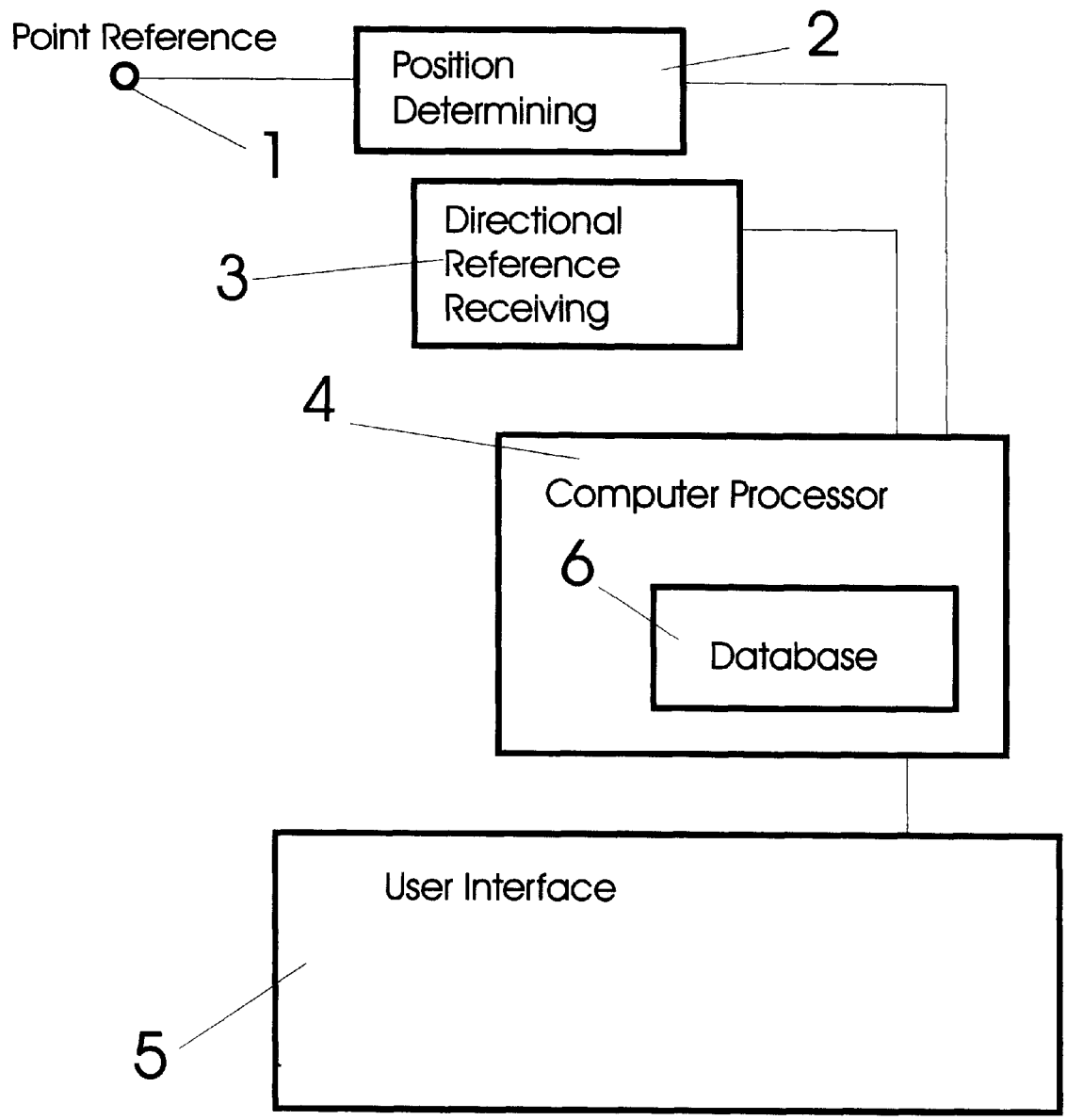
FIG. 1 is a block diagram illustrating major elements of a device of the invention.

FIGS. 5–14 similarly show geometries of importance.

PREFERRED EMBODIMENTS OF THE INVENTION

In accordance with each of the preferred embodiments of the invention, there is provided apparatus for and methods of presenting information relating to objects being addressed. It will be appreciated that each of the embodiments described may include both apparatus and methods and that an apparatus or method of one preferred embodiment may be different than an apparatus or method of another embodiment.

Throughout this disclosure, reference is made to some terms which may or may not be defined in popular dictionaries exactly as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. For purposes of this disclosure:

A geometric descriptor is a mathematical definition of a geometric body. A geometric descriptor of the invention is used in association with an object which may be addressed by systems of the invention.

An information or data element is a database record which relates to a particular object of interest. An information element may comprise a plurality of forms of multi-media data including but not limited to: text, audio recordings, video streams, pictures, photographs, icons, Java applets, etc. In addition, each information element has associated therewith a geometric descriptor.

Address is a term used herein as a verb, most commonly with the gerund -ing, to indicate a relationship between a device of the invention and an object; the object being the subject of the address. A device of the invention which is pointing at an object is said to be 'addressing' the object.

An address indicator may be a geometric construct, examples include vectors and cones, which has a pointing direction associated therewith. In addition to a reference point and reference pointing direction, some address indicators, for example a cone, subtend a solid angle or otherwise have spatial extent.

A range gate is a geometric segment which is a subset of an address indicator having a first endpoint or planar region at some minimum distance from a point reference and a second endpoint or planar region at some maximum distance from the same point reference.

Objects refer to any element which may be of interest to a user. An object may be a real tangible object or may be a figurative element in space. The term 'object' should be read in a liberal sense. Although buildings and mountains suggest concrete forms of objects, objects for purposes of this disclosure include abstract forms as well. For example, the region of airspace over an airport which may be restricted is considered an 'object'. Indeed any region of space may be considered an object whether it actually contains a tangible object therein or not.

In simplest versions of the invention, apparatus include the following elements as described herefollowing.

Geometric References

Devices of the invention include a point reference. This may be mere structural construct. The actual point may or may not correspond to any tangible object or element of the device. Alternatively, it may be collocated with an actual physical element of the device. In either case, an important relationship is made between the point and a position determining means which is also included in devices of the invention.

Position Determining Means

A position determining means is arranged to measure the position of the point reference. Since in many embodiments of the invention the position determining means is a global positioning system GPS receiver, the point reference lies at the center of the sphere which is defined by the resolution limits of the positioning system. For practical purposes, a handheld receiver which includes a GPS antenna may be said to have the point reference within the handheld unit. The position determining means therefore measures the position of the handheld unit. Many forms of alternate positioning systems may be used to accomplish the identical task. The particular positioning system employed may be chosen for a specific task at hand, for example a global positioning system would not be appropriate for a small space such as a warehouse so a radio triangulation technique may be preferred. The essence of the invention is not changed by the particular choice of positioning system. Therefore versions of the invention should not be limited to one particular type of positioning system. The limitation described by 'position determining means' is met when the position of the point reference is measured and made available to a computer processor. Therefore, by use of the term "position determining means" it is meant that any conceivable means for determining the position of a point reference and making that position known to a computer is anticipated. Experts will recognize that there are many thousands of possible ways of determining position and it will not serve a further understanding of the invention to attempt to catalogue them here. The reader will appreciate that the broadest possible definition of "positioning determining means" is intended here.

Attitude Determining Means

Systems of the invention also include an input receiving means for receiving an indication of a directional reference. In simple versions, a keypad may be used to indicate a pointing direction. More sophisticated versions may include means for receiving an indication of a directional reference including an inclination parameter as well as direction in a horizontal plane. Although a keypad may be used in certain versions of the invention, it does not improve the description to limit the input receiving means to any particular device. Similar to the position determining means described above, the limitation described as 'input receiving means' is fully met by any device or systems which may be used to input a directional reference and make that information known to a computer processor.

User Interface

A user interface of the invention serves to convey information to a user of the device. A simple speaker driven by computer audio systems is operational for producing audio information and description to a user. Similarly, a display screen driven by video systems of a computer functions to present video or graphic information to a user. Although a display screen and speakers are preferred devices for interfacing with a user, other systems include non-display type visual systems such as simple light emitting diodes, or non-speaker audio systems such as buzzers, tactile outputs such as vibrating systems, et cetera. In all cases, a user interface includes a transducer which is electronically driven by the computer which produces some physical disturbance which can be detected by a user's senses.

Computer Processor

In addition, systems of the invention include a computer programmed to execute specific routines. In particular, a computer is arranged to receive inputs from the position and attitude determining means. From these inputs, the computer defines a geometric body as an address indicator in association with the device reference point and pointing direction. From this geometric body definition, the computer performs a database search and determines if any of the geometric objects described in the information element geometric descriptors intersects the address indicator. Information elements which are determined to intersect said address indicator has data associated therewith which may be recalled and played back to the user interface as appropriate and in agreement with other criteria which may be selected.

Database

In systems of the invention a database is arranged to accommodate data relating to objects of interest. Data relating to objects is prepared and stored in a predetermined and well organized fashion. The data may be stored in many formats and configurations and may be of the nature sometimes referred to as 'multi-media'. A database of the invention is comprised of a plurality of information elements. Each information element relates to a particular object which may be of interest to users of devices of the invention. Each information element contains a descriptor which describes a geometry and location relating to the object for which the stored information pertains.

A geometric descriptor is a definition set for a specific geometry including position. For example, in a Cartesian coordinate system, a sphere may have its center at a point (X, Y, Z)=(2, 5, 9) while having a radius of 7 units. Thus the sphere and all of the points within the sphere's boundary are completely described. A geometric descriptor may describe a geometry which includes: a single point; alternatively, a polygon; which defines a planar region; a solid such as a sphere; or even a three dimensional object of arbitrary shape. Thus the rules which perfectly describe those geometries which are well known in the sciences are used in geometric descriptors of the invention. In all cases, a geometric descriptor includes at least one point and more frequently includes a set of many points.

Methods of the invention are best described as being comprised of the follows steps.

In a first step, a direction reference is indicated by a user and the direction reference is received by the system.

In a step to be performed after the first step, the position of the device reference point is determined. A GPS employed locally at the device operates to measure the global position of the reference point. Although convenient measurement units might be latitude, longitude and altitude, others similarly provide workable solutions. Data from the position determining step is passed to the computer processor.

Data received at the computer processor from the position determining means is used in conjunction with the indicated directional reference to define an address indicator.

A search of database information elements is commenced. A search operation reads database geometric descriptors and performs a coincidence test to see if an address indicator intersects any of the points in a geometry described. Items meeting that criteria are recalled for further processing and presentation at a user interface.

A more complete understanding can be realized in consideration of the drawing figures with reference numerals as follows. FIG. 1 illustrates a block diagram of major components of devices of the invention. A point reference 1 is a geometric construct to which measurements of position are directed. The point may correspond to an actual device such as a GPS antenna or may alternatively be merely a point in space having a convenient location within a physical device. A position determining means 2 is in communication with the point reference and is arranged to measure its position. The position determining means is further in communication with a computer. The position measurement is made without regard to any particular coordinate system in various versions of the invention but some versions using GPS devices preferably use a latitude, longitude and altitude scheme which allows one to define position anywhere on or above the Earth's surface. Determination of position within a coordinate system is the essence of the function performed by the device without regard for any coordinate system chosen for convenience.

A directional reference receiving means 3 is arranged to communicate with a computer. The directional reference receiving means reports direction information to a computer processor.

A computer processor 4 is coupled to and receives measurement data from position and attitude determining means. The computer is further connected to a user interface 5 and presents information to a user by way of the interface. The computer includes a database 6 which may contain preprogrammed information.

Figure 2:
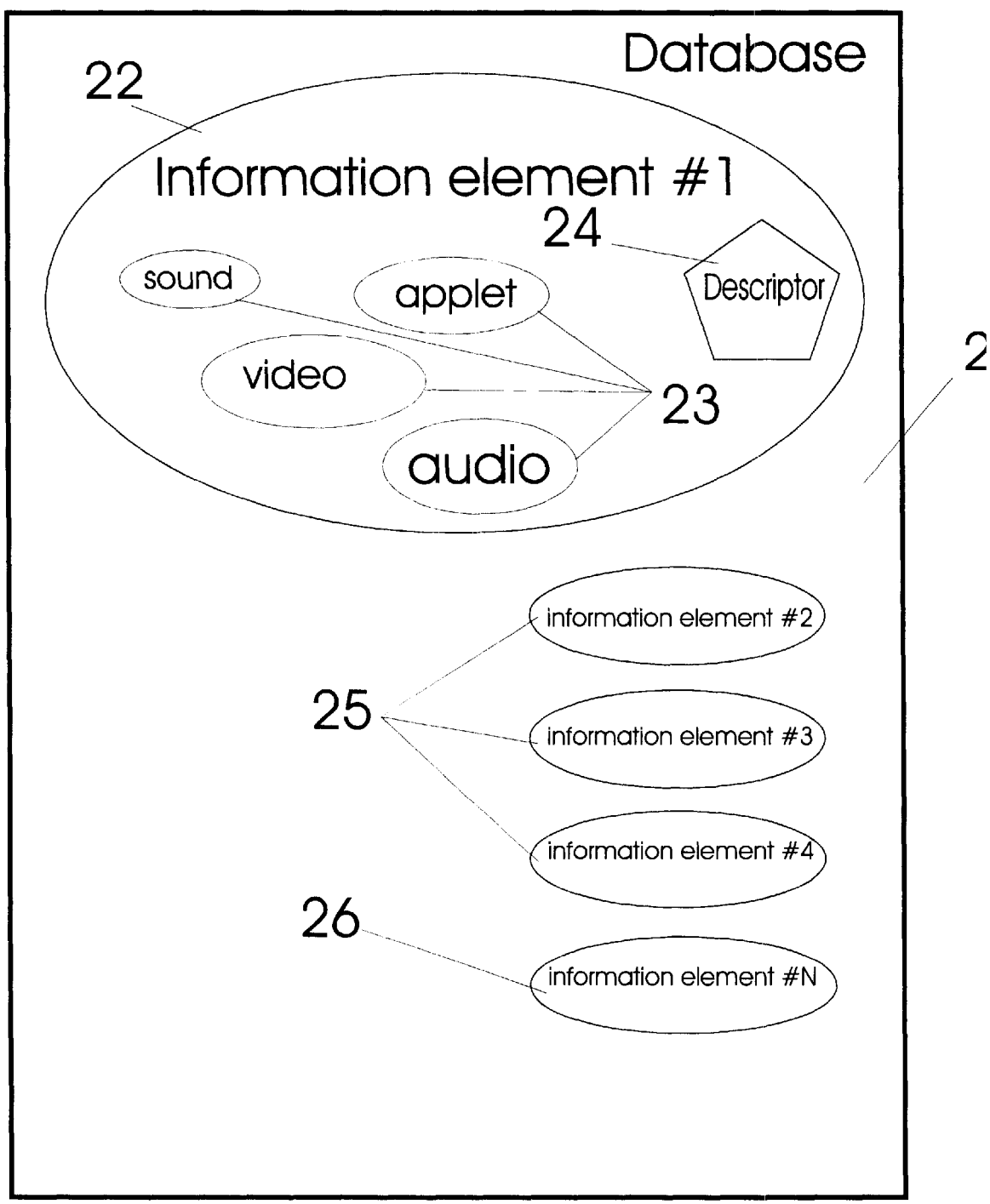
FIG. 2 is a block diagram showing the configuration of a database of the invention.

Now, with reference to FIG. 2 the database may be more precisely defined. A database 21 of the invention has a special construction. The database may include a great plurality of basic units each referred herethroughout as an information element 22. An information element may contain stored information in various formats 23. Each information element contains a descriptor 24 which defines a geometric body of interest. Additional information elements 25, each having their own descriptors and stored information, further make up the database. The database is comprised of any number of information elements the last element being the $N^{th}$ element 26.

The above described elements, when assembled as directed, form a device of the invention which is preferably integrated into a small handheld machine. A sturdy case formed of durable plastic operates to contain the assembly and allows a user easy access to functions associated therewith.

Figure 3:
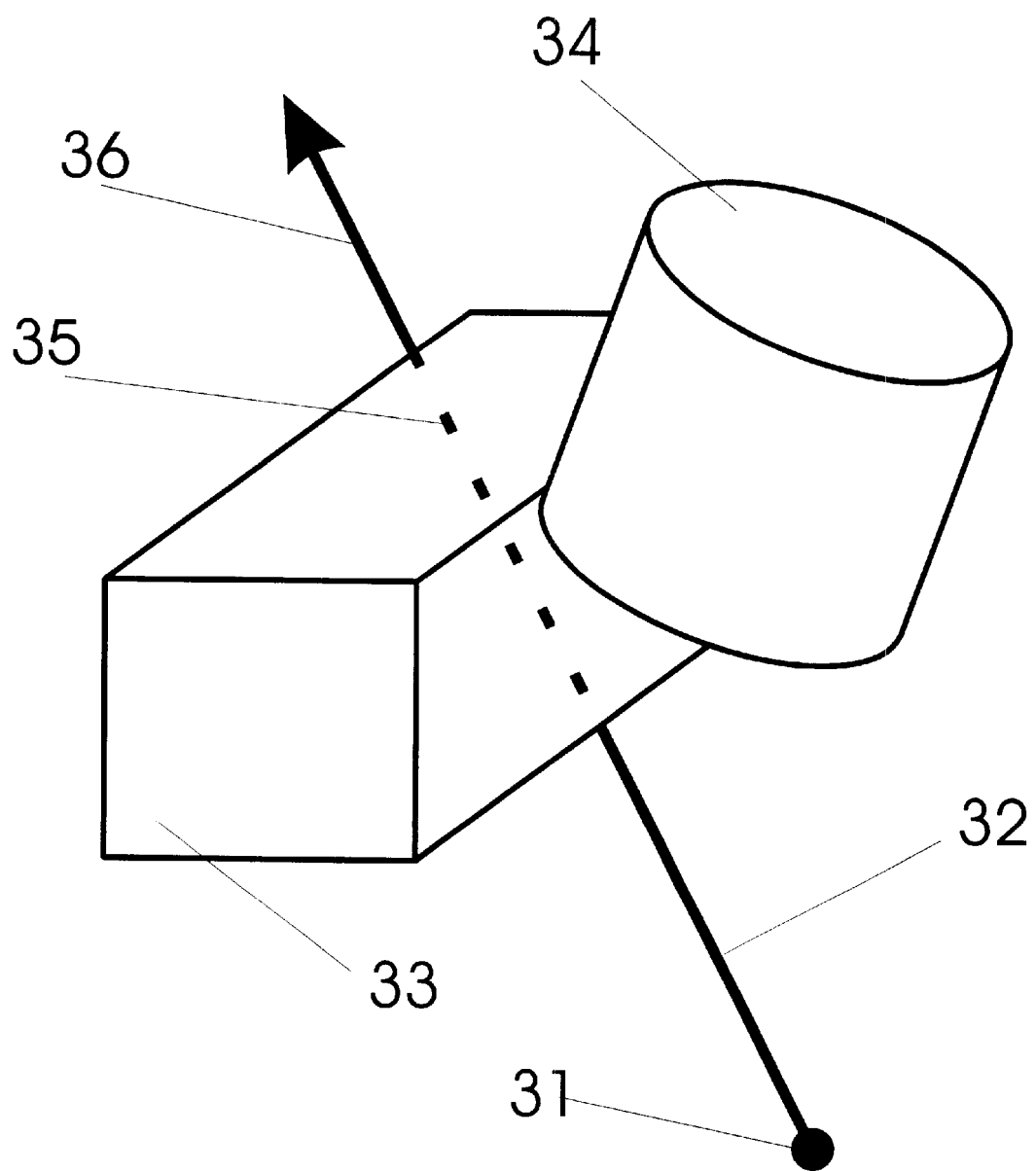
FIG. 3 is a geometric construct of interest.

In consideration of the above described arrangement and the following procedural description with reference to additional drawings, one will now better appreciate operation of some preferred devices of the invention. Drawing FIG. 3 illustrates a simple geometric construction showing a point reference 31, a directional reference 32, a rectangular cylinder 33 and a circular cylinder 34. A portion of space 35 indicated by a dotted line is shared by the rectangular cylinder and an address indicator 36. The address indicator, in this case a simple vector, has an endpoint coincident with the point reference and colinear with the direction reference. Having full geometric definition of the vector, and the cylindrical objects, a computer routine is executed to determine which objects are intersected by the vector and which are not. In the case of FIG. 3, the square cylinder is intersected by the vector but the circular cylinder is not. A device having a reference point 31 and directional reference 32 is said to be addressing the square cylinder. A computer having programmed information as to the location and shape of the cylinders can tell when a vector is intersecting the space of interest and when it is not. This fact depends on the condition that the cylinders remain stationary after the computer is programmed. The computer only needs the preprogrammed information and information regarding measurement of the device point reference and indicated directional reference. The computer does not require input from any real object which may be associated with the space of interest and does not need to detect or probe it in any way.

For example if the square cylinder 33 is associated with a hotel known by the computer, the hotel is implicitly addressed whenever the device addresses the square cylindrical space. If a construction crew removes the hotel and the computer is not updated, the computer still assumes the presence of the building because it is a necessity that the space defined by the information element (hotel) geometric descriptor remain despite the actual presence, or lack of presence, of the building therein.

Accordingly, devices of the invention merely determine what space is being addressed and imply that particular objects are being addressed by way of the association of objects to spatial definitions or geometric descriptors. The mere fact that information contained in the database is accurate suggests and implies the presence of the hotel. It is the geometric descriptor which is preprogrammed into the computer which dictates if an intersection exists or not. The actual presence of an object does not affect whether the device is addressing it or not. It is useful to point out that one may generally rely on a hotel remaining in its set position.

One may rely on this technique for most items of interest. For example, the Empire State Building presently occupies a space which is well defined. It is a very reliable fact that the Empire State Building will similarly occupy that same space tomorrow. A device of the invention which is addressing the Empire State Building, the position of the device being measured and a direction indicated by a user defines an address vector, can reasonably deduce that the building is there. In this way, devices of the invention 'know' what they are addressing simply by measuring position and receiving an indication of attitude and comparing that information with information in a database.

Figure 4:
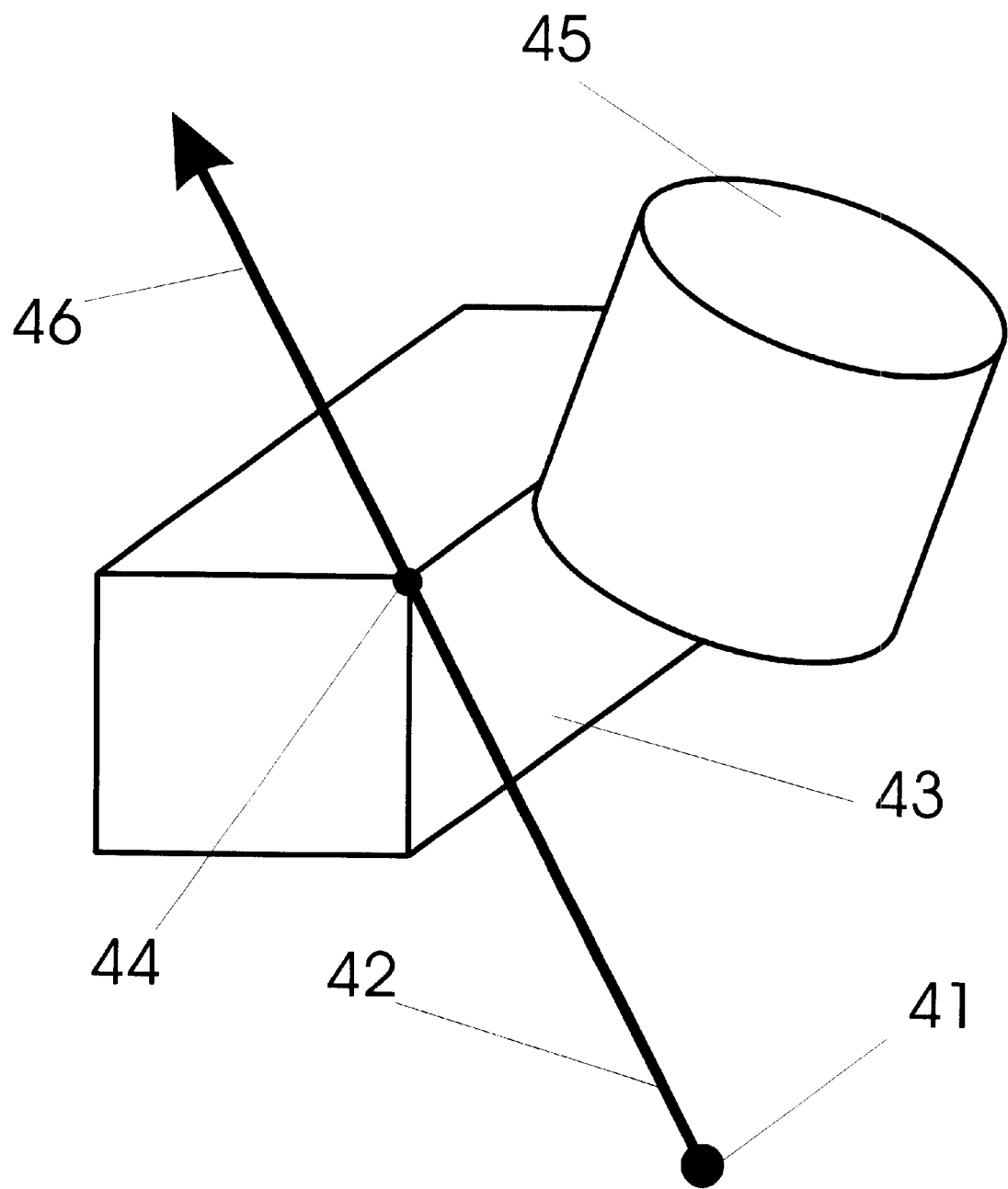
FIG. 4 shows a similar geometric construct which illustrates an important geometry.

For purposes of this disclosure, an intersection of only one point is sufficient to have the address vector be coincident or to have an intersection with the geometric object. FIG. 4 illustrates a scheme whereby the vector defined by the reference point 41 and the reference direction 42 is coincident with the square cylinder 43 at a single point 44. The circular cylinder 45 is not intersected by the vector and is not said to be coincident therewith.

Figure 5:
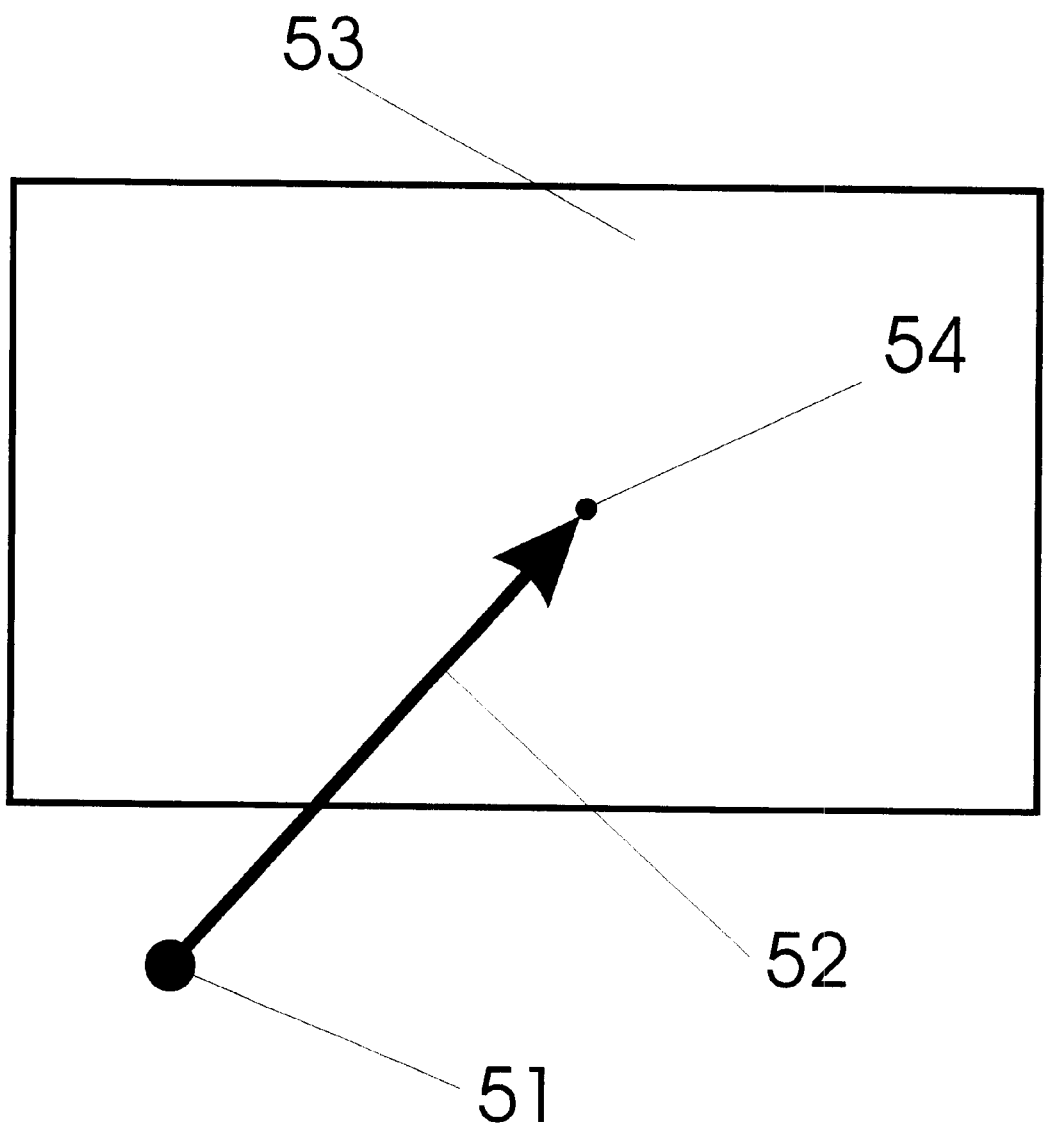

It is not a requirement that an object be three dimensional; quite contrarily, a two dimensional or single dimensional object forms perfect basis for an intersection with an address indicator in the form of a vector. FIG. 5 illustrates a point reference 51 and a direction reference 52 forming a vector which intersects a plane 53 at a single point 54. One might envisage every advertising billboard as a plane having position information associated with it. When programmed properly, these geometric definitions allow a device of the invention to know of any billboard anywhere. When pointed at a billboard the device can identify the advertiser and be made to respond by playing back information such as a product jingle, text information, video clips, et cetera. The connection between the billboard (object) and the geometric descriptor is made via the database where real objects are associated with geometric descriptors in preprogrammed data storage schemes.

Figure 6:
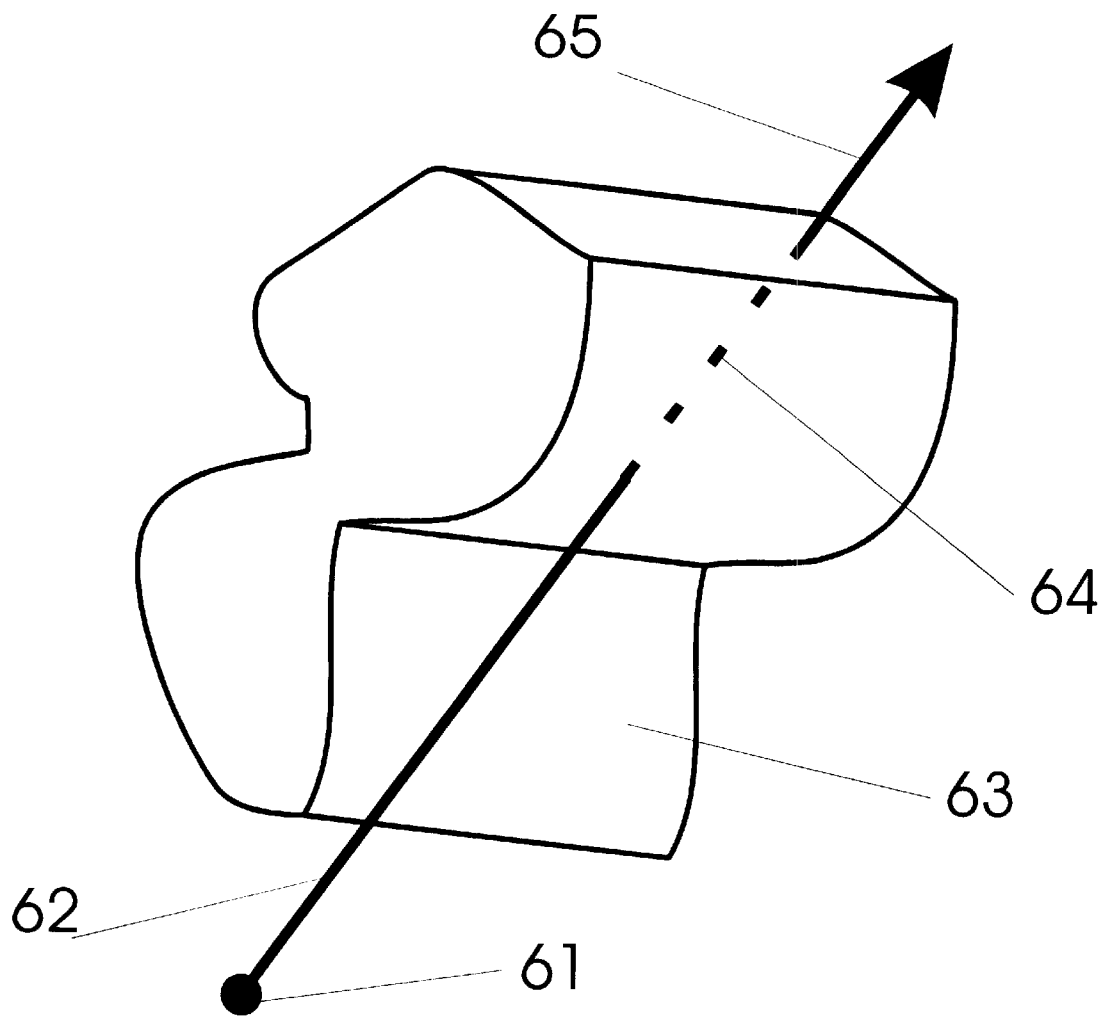

The shape does not necessarily have to be regular or "well-behaved". A geometric description is available for a complexly shaped element as well as those more readily described in simple terms. FIG. 6 shows a reference point 61 and reference direction 62 which define an address indicator in the form of a vector having an intersection with a spatial element 63 at line segment 64.

A geometric descriptor used in devices of the invention to associate object data with position and shape may change in time. Although the trains in Japan are moving objects, they move in a highly reliable way in accordance with a rigid schedule. Therefore, a geometric descriptor might include information about changes of position with respect to time. When a device of the invention is pointed at a moving train, inquiry to the database may yield an intersection with a 'moving' spatial element, i.e. an object having a position descriptor which is dynamic with respect to time.

Figure 7:
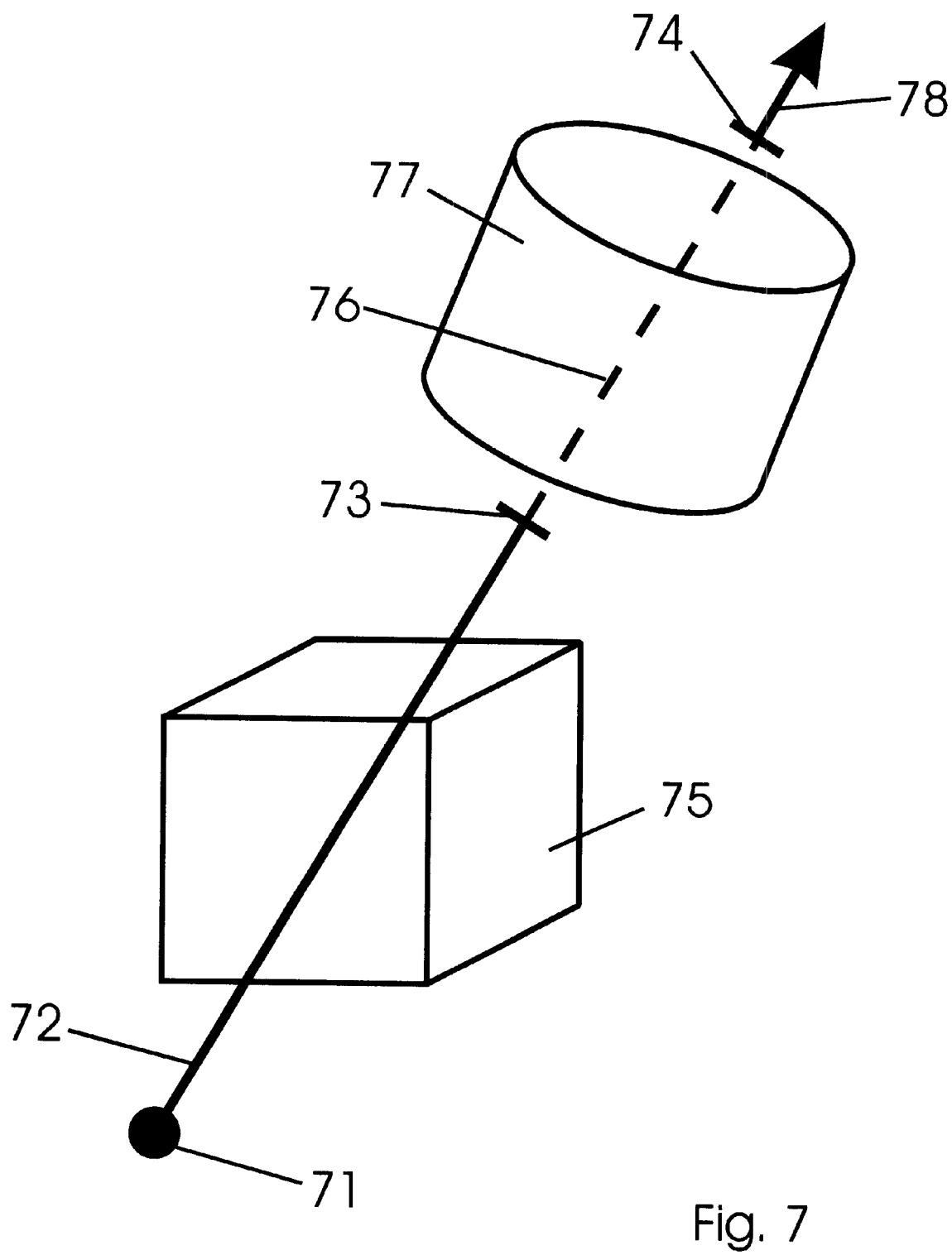

FIG. 7 shows an additional construction of interest. Although the term 'vector' implies a line segment with infinite extent in one direction, in some cases only a certain portion of the vector is of interest. Some operations described hereafter will refer to a "range gate". A range gate has two delimiters which define a portion of the vector which is of particular importance. FIG. 7 shows a reference point 71, a reference direction 72, a first delimiter 73 a second delimiter 74, a cube body 75, a line segment 76, a circular cylinder 77, and a vector 78. Although the vector 78 intersects and passes through both the cube body and the circular cylinder, only a portion of the vector in the range gate, i.e. that portion between delimiters 73 and 74, forms an intersection with the cube body. Thus, in some instances, a range gate is created to designate which portions of the vector are of greatest interest. Thus a user interface may present information regarding the cylinder and the cube but where information relating to the cube is presented with priority.

Figure 8:
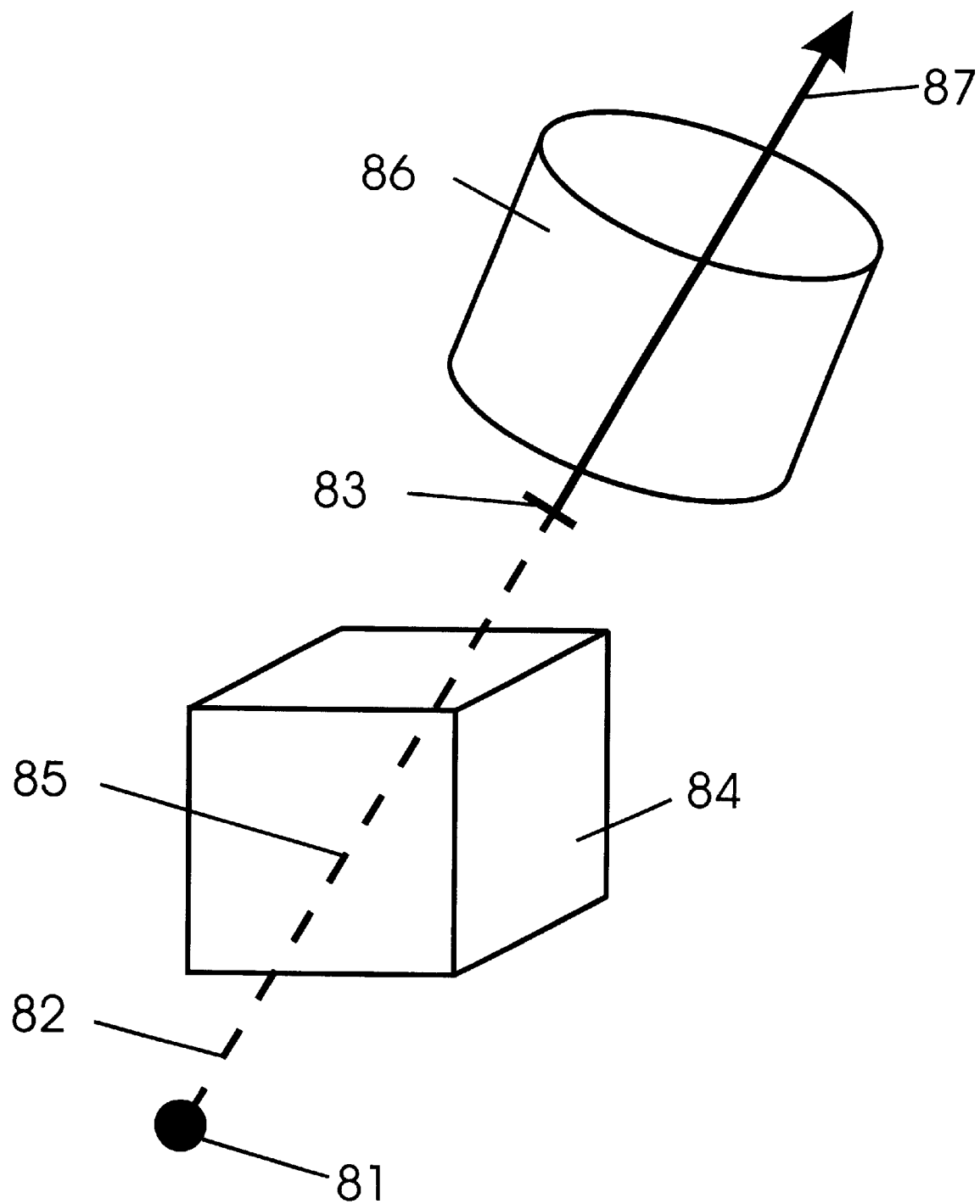

FIG. 8 shows another important range gate. A range gate may include all the points along a vector from the reference point to a selected maximum distance. For example a user may specify all targets "within fifty meters of the device". Objects which are greater than fifty meters away from the user are not included in any recall effort. FIG. 8 illustrates this concept. A reference point 81 and line segment 82 form basis for a system having a range gate starting at the reference point and ending 83 at some predetermined distance from the reference point. A cubic object 84 has a portion 85 of the vector passing through it. Similarly, circular cylindrical object 86 also has a portion of the vector intersecting that object. Of course, the vector 87 continues on without limit. The difference between the cubic object and the circular cylindrical object is that the cubic object lies within the range gate region of the address indicator and the circular cylindrical object does not. A computer search engine arranged to be responsive to criteria describing such a rate gate is useful in restricting objects which are presented.

Figure 9:
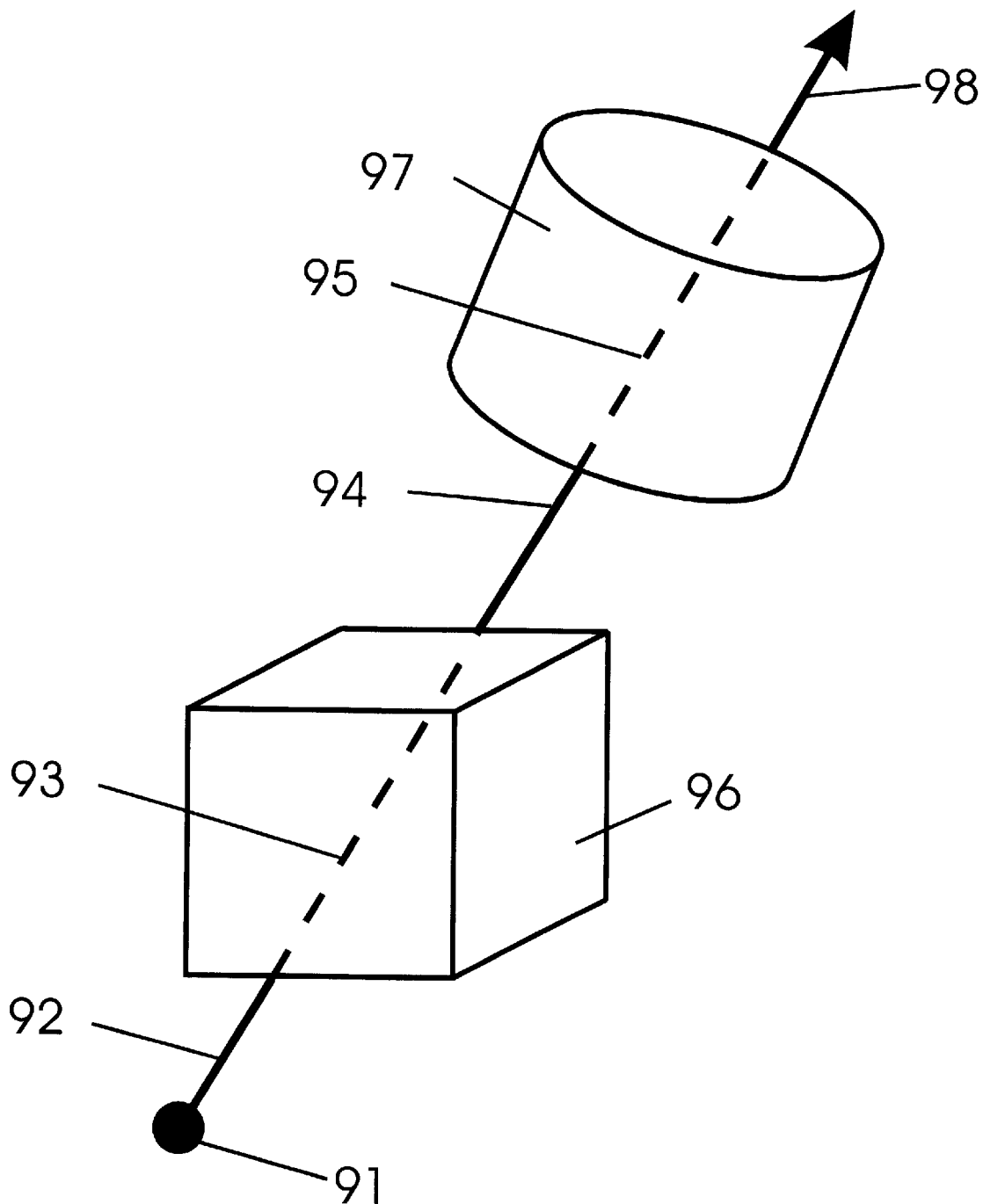

It is entirely possible that two objects fall within the limits of a particular range gate. FIG. 9 illustrates a reference point 91 and a direction vector 92 which passes through 93 a first object, continues through space 94 and passes through a second object 95. In this case, both objects a cubic object 96 and a circular cylindrical object 97 form an intersection with the vector and lie with a range which lies on the address indicator somewhere past the point indicated as 98. A search engine therefore identifies both objects as being addressed by the system. A display can handle this occurrence by listing all objects being addressed simultaneously. A list may include a scheme whereby closer objects are listed first while more distant objects appear nearer the end of the list. A user may select from the list an object of particular interest and request from the computer more information relating to that object.

Although the previous examples primarily use a vector for an address indicator, it is not necessary that an address indicator be in vector form. An address indicator may be any geometric construct including but not limited to: a point; a line; a vector; a line segment; a plane; a planar section; a cone; a conic section; et cetera. To determine intersection with objects of interest, the search criteria may simple determine if any point of an address indicator is shared with any point described in an information elements geometric descriptor.

Figure 10:
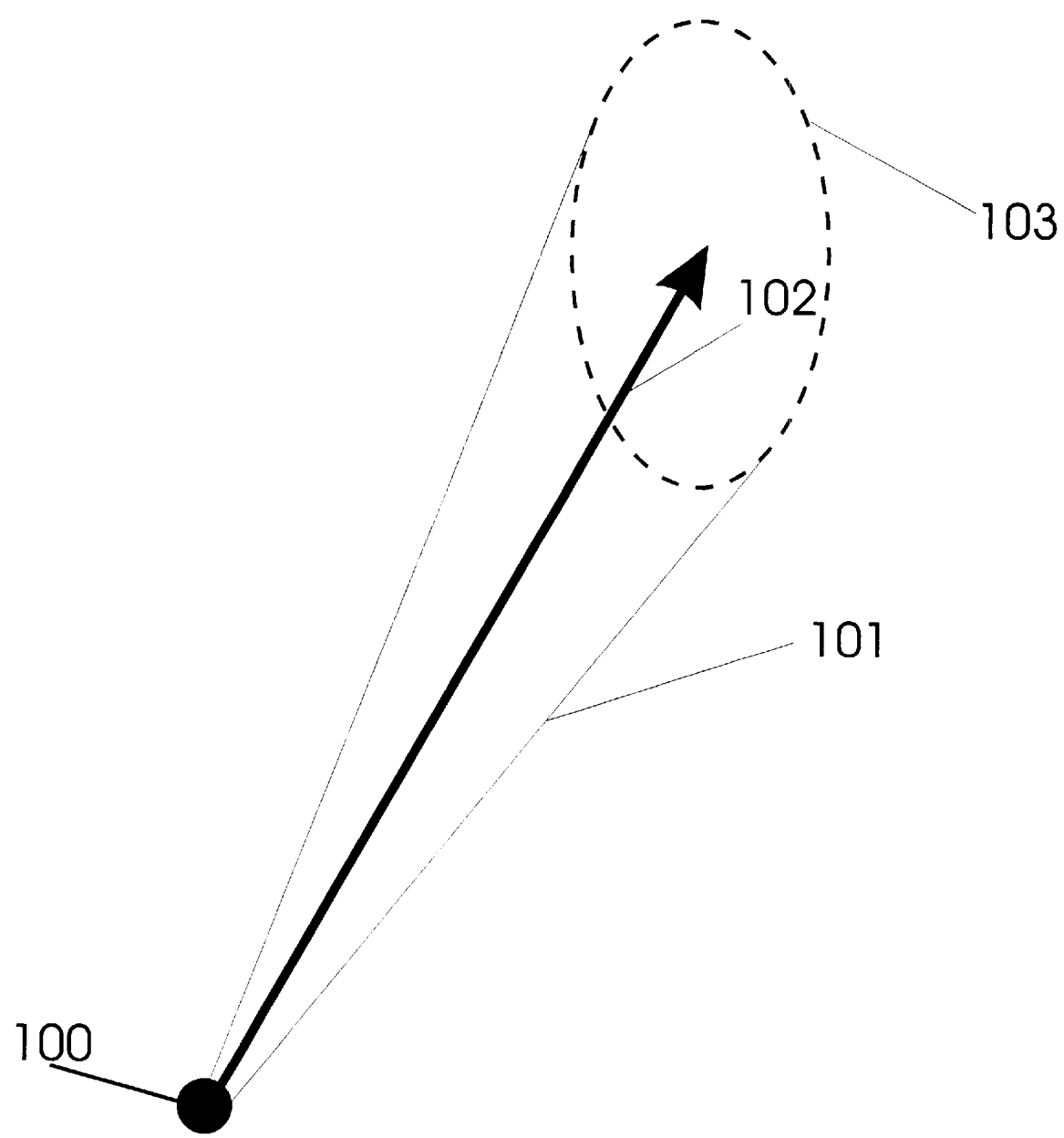

With reference to drawing FIG. 10, one will appreciate an address indicator which is in the shape of a cone. Reference point 100, is joined by a surface 101 which describes a cone having an axis 102. The conic axis may be arranged to be colinear with the system reference pointing direction. Although a cone may extend in space without limit, ellipse 103 is useful to indicate a cross section of the cone. The careful observer might argue that the "cone" shown is not truly a cone in the sense that it is wider in one dimension that in an orthogonal dimension. This loose interpretation of a cone is intended to illustrate that the geometric shape of an address vector may be of complex form.

Figure 11:
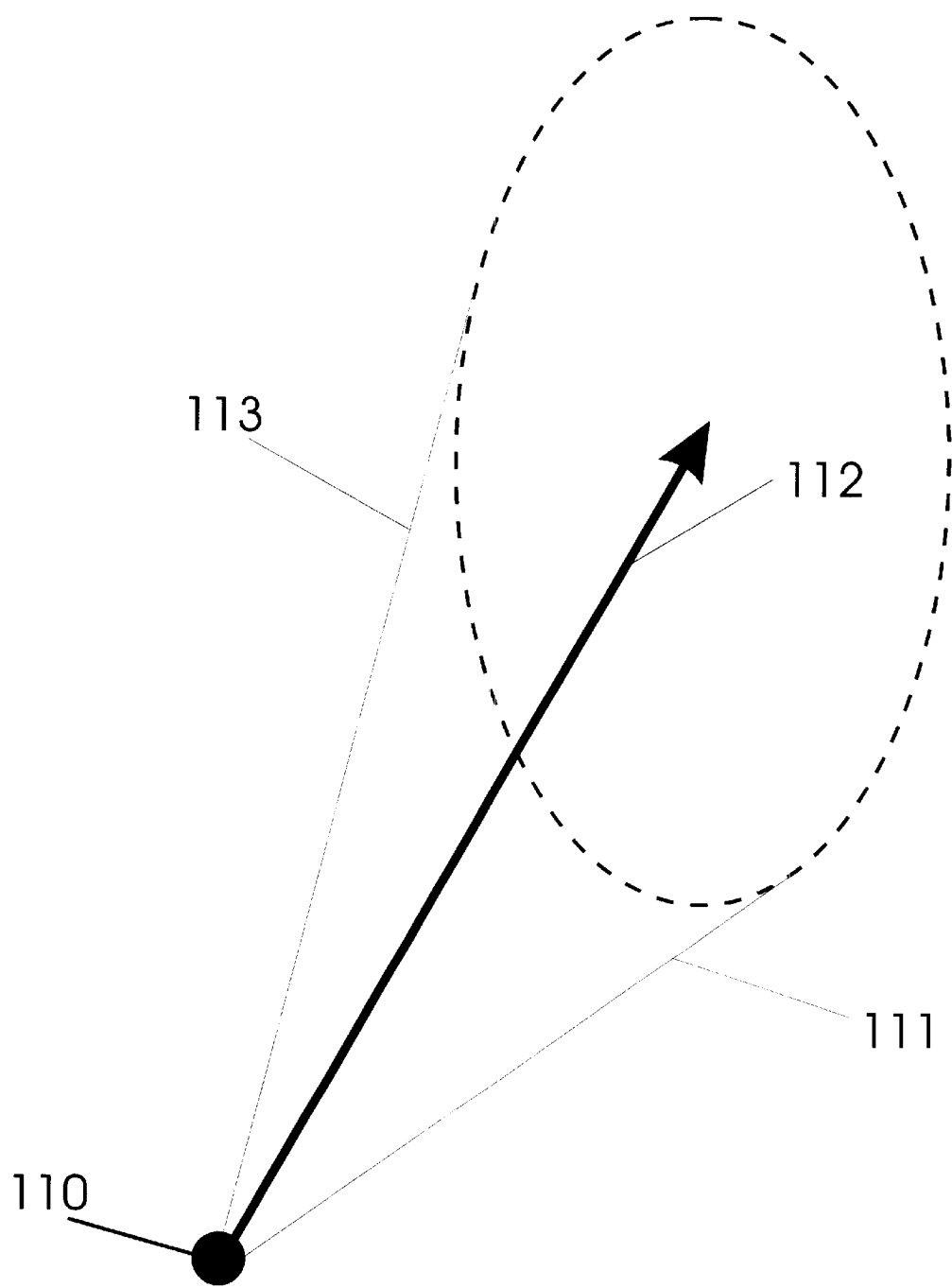

In some systems of the invention, it is useful to have an address vector which is adjustable. FIG. 11 shows a conic shape similar to that of FIG. 10 whereby the extent of the limiting surface has been increased. Reference point 110 forms the apex of a cone having a surface 111 which is quite portly in comparison to the cone of FIG. 10. The conic axis 112 is associated with the system pointing direction. Devices of the invention may include an adjustment setting which can be set by a user to alter the shape and size of an address indicator.

Figure 12:
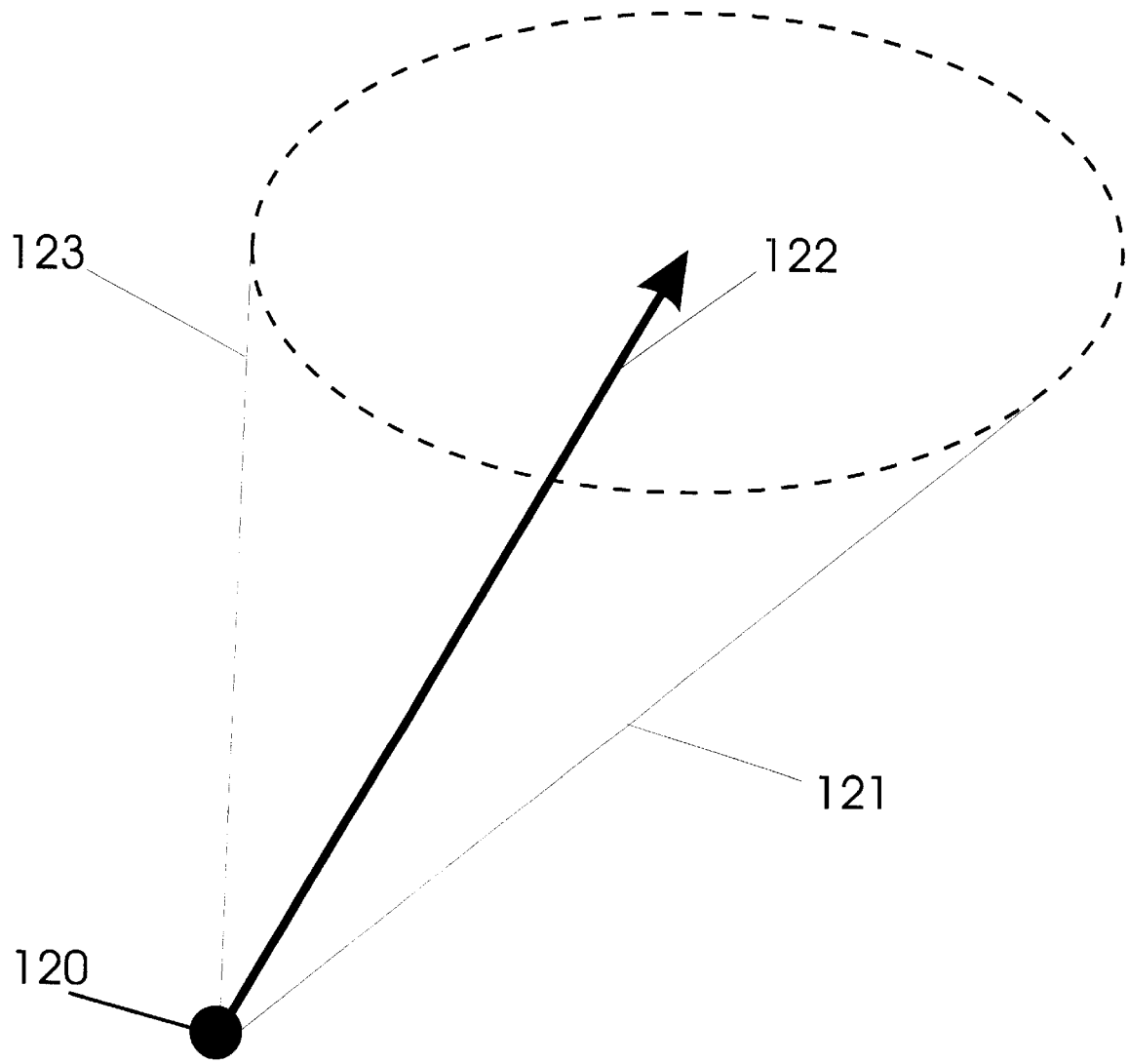

Such adjustment may be used to configure the address indicator to take a shape having a width which is greater in extent than its height. FIG. 12 shows a reference point 120 and address indicator surface 121 symmetric about pointing reference 122. One will readily appreciate the aspect ratio is different than those shown in prior figures.

Figure 13:
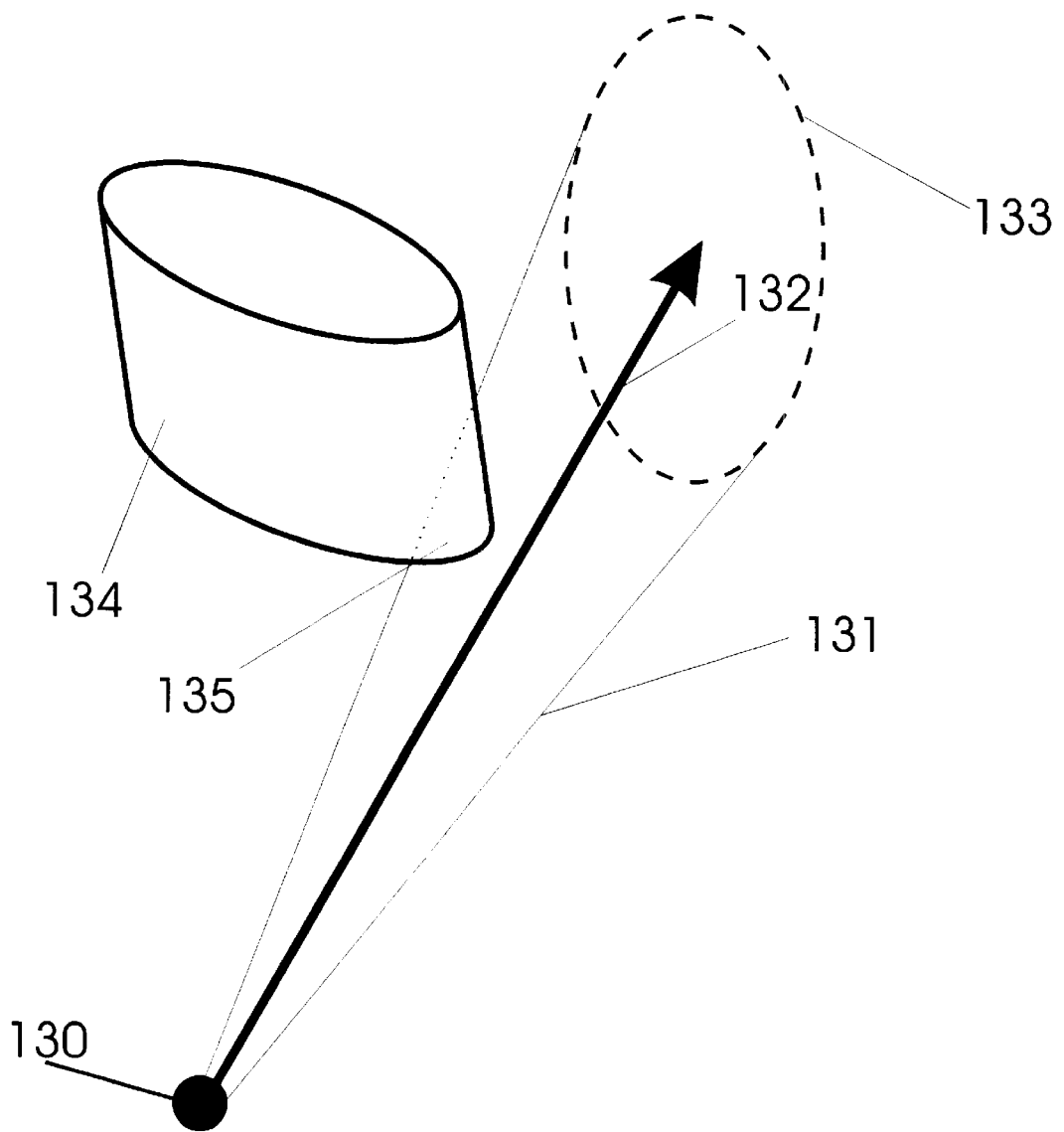

FIG. 13 shows how an address vector may be said to be intersecting an object. Reference point 130 is the apex of a conic address indicator having a surface 131 and a reference pointing direction 132 and cross section 133. Cylindrical object 134 contains spatial extent 135 which is shared with the address indicator. In this regard, it is said that a device of the invention having a conic address indicator as shown is addressing the object. One will appreciate that it is not necessary that the reference pointing direction be intersecting the object, but that any portion of the address indicator is sufficient to form an intersection. The database search can be made to be responsive to this condition.

Figure 14:
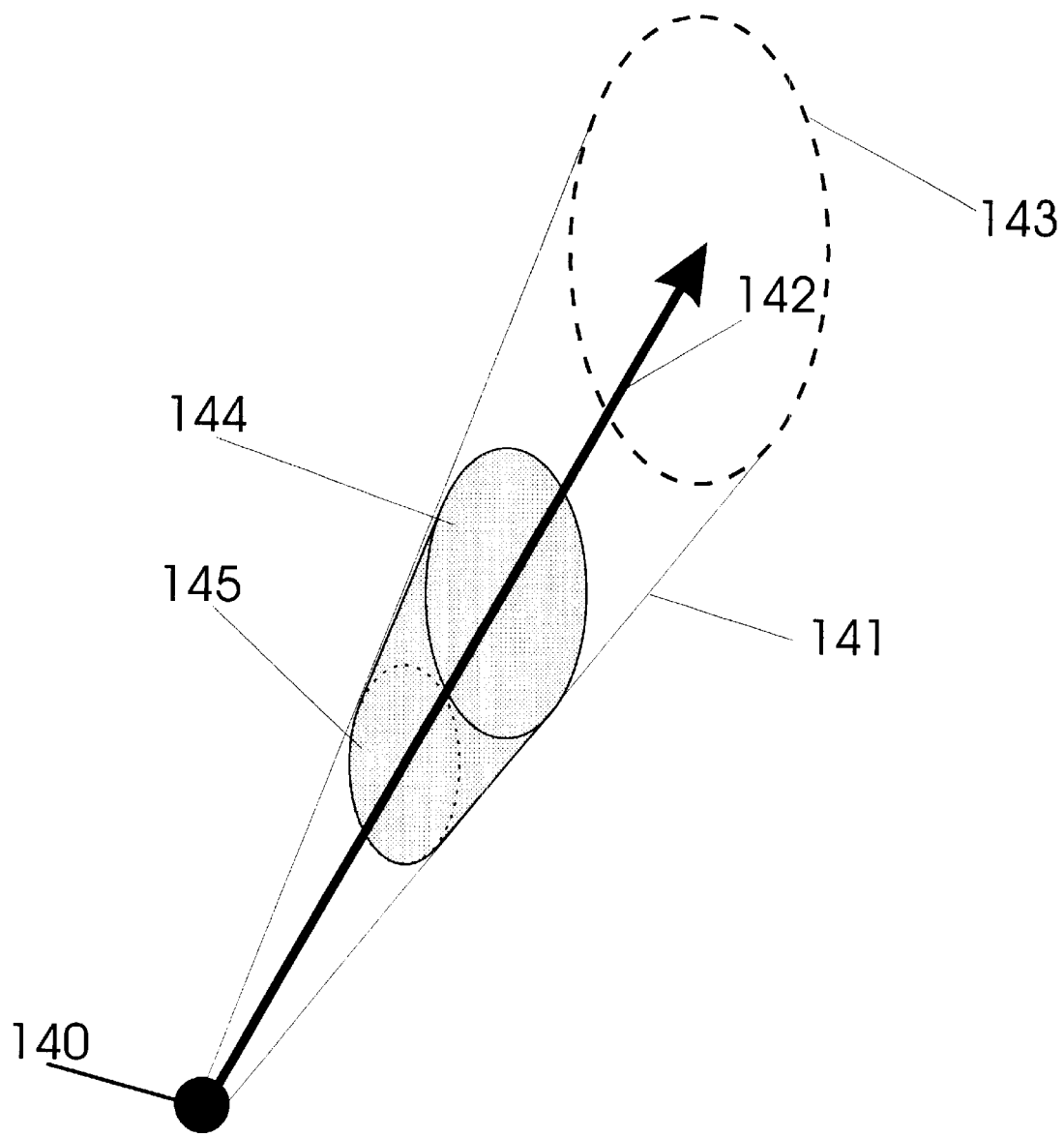

Range gates cooperate with address indicators having spatial extent. FIG. 14 shows a reference point 140, conic surface 141, pointing reference 142 and cross section 143. A conic section having cross sections 144 and 145 form a range gate which may be used to limit database searches.

Of course with geometric shapes one might be quite liberal in devising various useful shapes. To be a valid address indicator, a geometric shape must merely have a reference point and reference pointing direction associated therewith.

One will now fully appreciate how a system which measures position receives attitude information via user input may present information relating to objects having an association with a particular geometry and location. Although the present invention has been described in considerable detail with clear and concise language and with reference to certain preferred versions thereof including the best mode anticipated by the inventor, other versions are possible. Therefore, the spirit and scope of the invention should not be limited by the description of the preferred versions contained therein, but rather by the claims appended hereto.

What is claimed is:

1. An apparatus for the presentation of information relating to an object being addressed, the apparatus comprising:
   a point reference;
   a position determining means;
   an input receiving means;
   a computer processor; and
   a user interface,
   said position determining means being arranged to determine the position of the point reference and convey position information to said computer processor;
   said input receiving means being arranged to receive as input an indication of a directional reference and convey direction information to said computer processor, said input receiving means being a keypad; and
   said user interface being in electronic communication with said computer processor.

2. An apparatus for the presentation of information relating to an object being addressed, the apparatus comprising:
   a point reference;
   a position determining means;
   an input receiving meas;
   a computer processor; and
   a user interface,
   said position determining means being arranged to determine the position of the point reference and convey position information to said computer processor;
   said input receiving means being arranged to receive as input an indication of a directional reference and convey direction information to said computer processor; and
   said user interface being in electronic communication with said computer processor, the apparatus further comprising a plurality of information elements stored in the computer in a database, each information element comprising stored information relating to an object which may be addressed by the apparatus, said apparatus further comprising an address indicator, said address indicator being a definition of a geometric body being associated with said directional reference and point reference, whereby said address indicator may be caused to form an intersection with one or more geometric descriptors, said geometric body being a conic section is arranged in accordance with a range gate definition.

3. A method of presenting information relating to an object being addressed, the method comprising the acts:
   receiving a directional reference input;
   determining position;
   searching a database; and
   presenting information,
   said receiving a directional reference input being further defined as receiving an indication of a direction;
   said determining position further defined as measuring the position of a point reference;
   said searching a database further defined as comparing an address indicator with a geometric descriptor of an information element; and
   said presenting information further defined as reporting results of a search where correlation is found,
   said presenting information step further including presenting information at a transducer operable for creating a physical disturbance which may be perceived by a human operator,
   said presenting information step further including presenting information on a transducer which produces a tactile output.

4. A method of presenting information relating to an object being addressed, the method comprising the acts:
   receiving a directional reference input;
   determining position;
   searching a database; and
   presenting information,
   said receiving a directional reference input being further defined as receiving an indication of a direction;

said determining position further defined as measuring the position of a point reference;

said searching a database further defined as company an address indicator with a geometric descriptor of an information element; and said presenting information further defined as reporting results of a search where correlation is found, said address indicator being a geometric body which is associated with said directional reference pointing direction and said point reference, said geometric body being a conic section arranged in accordance with a range gate.

* * * * *